United States Patent [19]
Jackson

[11] Patent Number: 5,322,021
[45] Date of Patent: Jun. 21, 1994

[54] COLLAPSIBLE PORTABLE DESK

[76] Inventor: Byron R. Jackson, 30 Searing St., Hempstead, N.Y. 11500

[21] Appl. No.: 929,414

[22] Filed: Aug. 14, 1992

[51] Int. Cl.⁵ .............................................. A47B 23/00
[52] U.S. Cl. .................................... 108/44; 108/45
[58] Field of Search ..................... 108/44, 45, 46, 43

[56] References Cited

U.S. PATENT DOCUMENTS

| | | | |
|---|---|---|---|
| 2,480,304 | 8/1949 | Pelton | 108/45 |
| 2,592,032 | 4/1952 | Henderson | 108/45 X |
| 2,640,595 | 6/1953 | Byford | 108/44 X |
| 3,172,636 | 3/1965 | Collier | 108/43 X |
| 3,791,314 | 2/1974 | Berretta | 108/43 |
| 4,765,583 | 8/1988 | Tenner | 108/43 X |
| 4,852,498 | 8/1989 | Judd | 108/43 |
| 5,085,153 | 2/1992 | McKee | 108/44 |
| 5,106,156 | 4/1992 | Marquis | 108/43 X |

*Primary Examiner*—Jose V. Chen
*Attorney, Agent, or Firm*—Fitzpatrick, Cella, Harper & Scinto

[57] ABSTRACT

A collapsible portable desk has a plurality of planar leaves that are foldably connected to selectively assume an extended configuration, in which the desk may be used, and a collapsed configuration, in which the desk may be carried by an exposed handle.

7 Claims, 7 Drawing Sheets

COLLAPSIBLE PORTABLE DESK

The present invention is directed to a collapsible portable desk for use in cars, trains, buses and the like by people who wish to continue working while traveling, and in particular for traveling salesman who wish to keep an up-to-the-moment record of their business activities.

BACKGROUND OF THE INVENTION

Traveling salesman, like many people who have to travel on business, need to keep a timely record of their activities. Particularly for those salesman who work out of their cars, the custom is to return to the car and complete any records and make any necessary diary or log entries in appropriate papers. This may be done in a traditional notebook or, more recently, by entry in a laptop computer. In both cases, it is far easier for the salesman to complete his report if he has a desk-like surface in the car, conveniently located, on which to place his diary or computer. The difficulty has been in providing a suitable desk that is both convenient to use and that affords the necessary writing surface and stability.

A number of different types of automobile desks have been proposed, but all such desks known to applicant have had one of several problems. For example, various types of desks have been proposed for use in cars that would simply lie on top of the seat cushion next to the driver. Such desks may be unstable, and certainly are prone to sliding sideways or forward on the surface of the car seat as the car accelerates or changes direction. Other desks have been known which are permanently or semi-permanently attached to the car's interior by clamps and/or rigid rods and the like. While such desks are stable, they may be difficult to install and remove. Such desks are also generally suitable for installation in a particular car, and are an encumbrance to the driver who might wish to remove the desk from the car, either to take it with him to another location or to store the desk in the trunk of the car. Furthermore, if the rods or other means used to hold the desk in place extend to the floor, dashboard or transmission hump, they could be uncomfortable and inconvenient. Other automobile desks have been proposed to ride on the transmission hump itself or even to fit over or on the steering wheel, but desks that are secured in the interior of the car are generally unsuitable for use on any other human-adapted seating surface, such as the seats in a bus or a train or even upon a chair or sofa in the driver's home. All of these car desks are either insufficiently secure, difficult to install and/or remove or present an unwanted obstacle when the desk surface is not required.

OBJECTS AND SUMMARY OF THE INVENTION

Accordingly, an object of the present invention is to provide a desk suitable for use in a car that avoids the above-described difficulties of the prior art.

Another object of the present invention is to provide a portable desk adapted for use in a car that is collapsible to permit easy installation in and removal from the car through a standard car door opening.

A further object of the present invention is to provide a collapsible portable desk suitable for use in a car which provides a stable writing surface in an extended configuration and which can be easily carried in a collapsed configuration.

In accordance with these and other objects of the present invention, a collapsible portable desk is provided which comprises a plurality of planar leaves foldably connected to selectively assume an extended configuration and a collapsed configuration. A first one of the leaves includes a grip portion adapted to be grasped by a human hand for carrying the desk and, in the collapsed position, all of the leaves are folded into parallel with each other, with the grip portion of the first leaf exposed for a human grasp, such that the desk, as a whole, is of a size that easily fits through a standard car door opening.

In accordance with a further aspect of the present invention, a second leaf has a surface adapted to form a horizontal work surface in the extended configuration, and one of the leaves other than that second leaf is adapted to immovably engage a human-adapted seating area and thereat to present the second leaf in place as the work surface, the second leaf being supported rigidly in place by at least one other leaf.

In accordance with yet a further aspect of the present invention, the first leaf including the grip portion is the same leaf adapted to immovably engage the seating area.

These and other objects, aspects and features of present invention will be apparent from the following detailed description of a preferred embodiment of the present invention, taken in connection with the accompanying drawings, wherein like reference numerals denote like elements.

DETAILED DESCRIPTION OF THE PREFERRED EMBODIMENT

Figure 1:
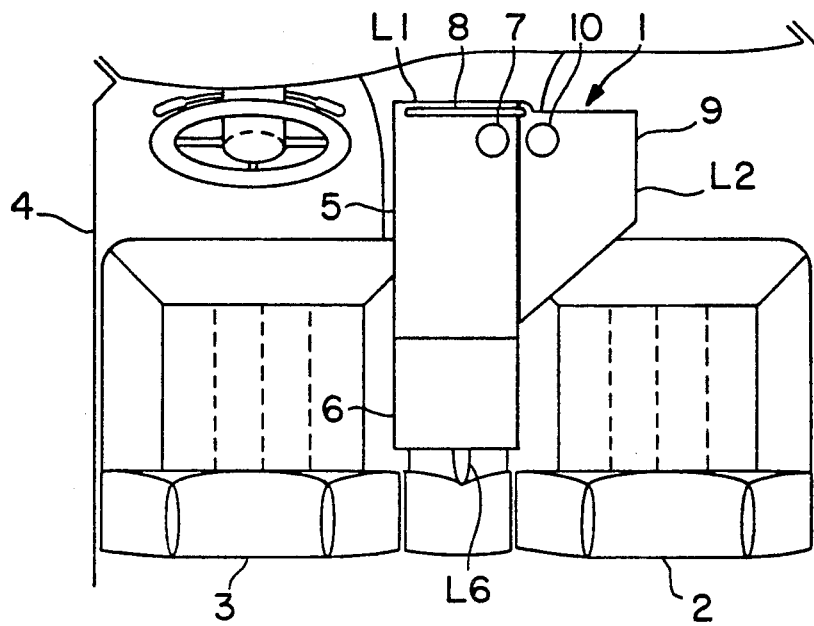
FIG. 1 is a top plan view of a collapsible portable desk in accordance with a preferred embodiment of the present invention, in its extended configuration in place within a car.

FIG. 1 illustrates a preferred embodiment of the desk in accordance with the present invention in place for use within a car. As shown in FIG. 1, desk 1 in the preferred embodiment is adapted to fit between the two front seats 2, 3 of a car 4, shown in partial cutaway. Desk 1 consists of a plurality of planar leaves that are foldably connected by hinges or the like to selectively assume the extended configuration illustrated in FIG. 1 or a collapsed configuration in which desk 1 may be easily removed from car 4 and transported, as discussed in detail below.

From above, the horizontal work surface of desk 1 is formed by two planar leaves L1, L2. Leaf L1 forms the major portion of the work surface of desk 1 in the extended configuration, and includes a first work surface 5 at a forward portion and a second work surface 6 at a rear portion that is slightly raised with respect to work surface 5 by approximately one quarter of an inch. Advantageously, this slight elevation of work surface 6 provides a rear barrier to books and other objects placed on work surface 5 to prevent them from sliding backwards when car 4 accelerates or turns. Leaf L1 may include a first cup opening 7 for holding a coffee cup or the like and a routed pencil slot 8 in which pens, pencils, paper clips and the like may be placed. Leaf L2 has a secondary work surface 9 which, in the collapsed configuration, folds over into contact with work surface 5 of leaf L1. Leaf L2 includes a second cup opening 10 for holding the coffee cup of a passenger.

Figure 2:
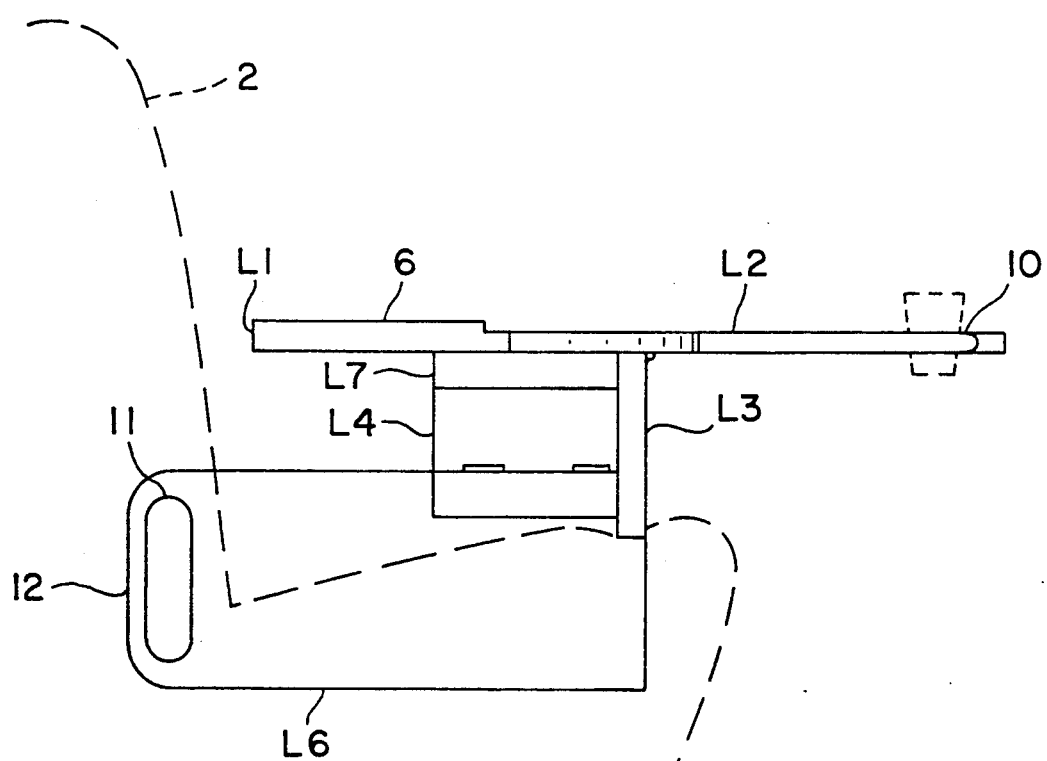
FIG. 2 is a side elevational view of the desk of FIG. 1 in place in the car.

Car 4 is illustrated as the type having two separate front seats 2, 3 having abutting seat cushions. Desk 1 in the preferred embodiment includes a planar leaf L6 which is adapted to be fitted between the cushions of seats 2, 3 to immovably engage those seats against forward, backward or side-to-side movement. The positioning of leaf L6 is shown more fully in FIG. 2, in which car seat 2 is shown in dashed lines. As illustrated in FIG. 2, leaf L6 fits substantially down within the opening between the abutting seat cushions of seats 2, 3 to be immovably held therein by the pressure of the seat cushions and the weight of desk 1. Leaf L6 also includes, at the rear portion thereof, a grip portion in the form of an opening 11 to form a handle 12 that may be comfortably grasped by a human hand.

A front planar leaf L3 is perpendicular to leaf L6 (see FIG. 9) to rest on the top of the seat cushions of seats 2 and 3 to further engage seats 2 and 3 to hold desk 1 in position without tilting. As described in more detail below, leaf L3 together with additional leaves L4 and L7 support the upper leaves L1, L2 rigidly in place to form the horizontal work surface of desk 1. A cup is illustrated in dotted lines in place in cup opening 10.

Figure 3:
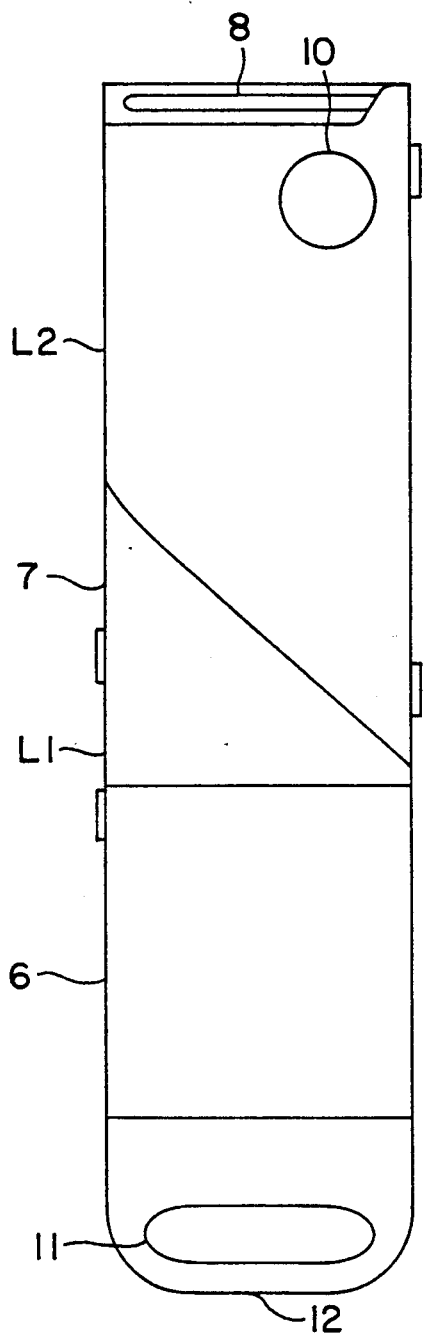
FIG. 3 is a top view of the desk in a collapsed configuration.
Figure 4:
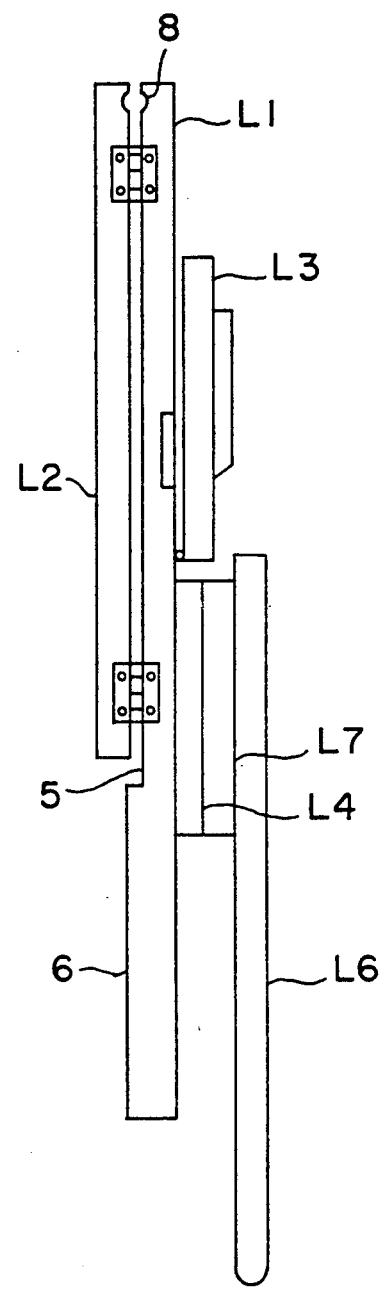
FIG. 4 is a side view of the desk of FIG. 3.

FIGS. 3 and 4 illustrate desk 1 in its collapsed position, in which it may be readily inserted into or removed from car 4 and carried by the owner. As illustrated in particular in FIG. 4, in the collapsed configuration all of the planar leaves L1–L4, L6 and L7, as well as planar leaf L5 (see FIG. 6), are folded into parallel with each other. As shown in FIG. 3, handle 12 and opening 11 are exposed for a human grasp when desk 1 is in its collapsed configuration.

All of the leaves of desk 1 are adapted to fold over and within the surface area of leaf L1 to a depth equivalent to the depth of five stacked leaves. While the depth of the leaves may vary in dependence upon the material used, in the preferred embodiment each leaf has the same depth equal to 1". Advantageously leaf L1 is 25" long by 7.5' wide, while leaf L6 extends approximately 5' beyond the rear end of leaf L1. As a result, the total size of desk 1 in its collapsed configuration is 30' long by 7.5" wide by 5' deep. At this size, desk 1 will easily fit through the car door opening of any conventional car, and furthermore may be readily carried by handle 12. Desk 1 in its collapsed configuration is also small enough to be stored conveniently in the trunk or back seat of a car, or in a closet at home or in the office. Therefore, desk 1 can be easily brought into a car in its collapsed configuration and then unfolded to extended configuration for placement and engagement with the car seats.

Figure 5:
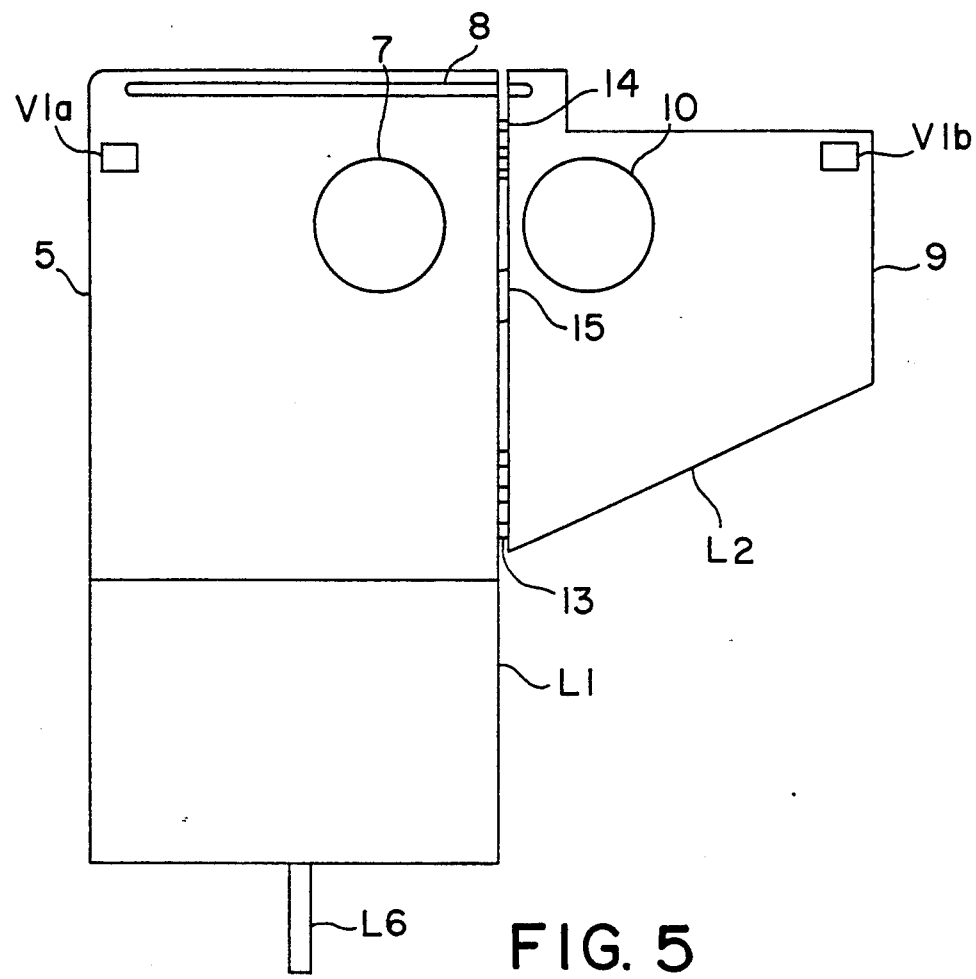
FIG. 5 is a top plan view of the desk in its extended configuration.

FIGS. 5–10 illustrate desk 1 in its extended position in greater detail to explain how leaves L1, L2 are rigidly held in place in the extended position and how all the leaves L1–L7 are held in place in the collapsed position. FIG. 5 is a top view of desk 1. On work surface 5 of leaf L1 is a first fastener in the form of a VELCRO patch V1a. On work surface 9 of leaf L2 is a matching VELCRO patch V1b which, when leaf L2 is folded over onto leaf L1, meets and engages patch V1a. Of course, other fasteners may be used in place of VELCRO patches, for example magnets or mechanical latches. Leaves L1 and L2 are foldably connected by means of two hinges 13, 14 on the bottom surfaces of the leaves. On leaf L1 between hinges 13 and 14 is a constraining abutment 15 against which leaf L2 rests in the extended position. Abutment 15 serves to prevent further rotation of leaf L2 beyond the horizontal and also removes pressure from hinges 13 and 14.

Figure 6:
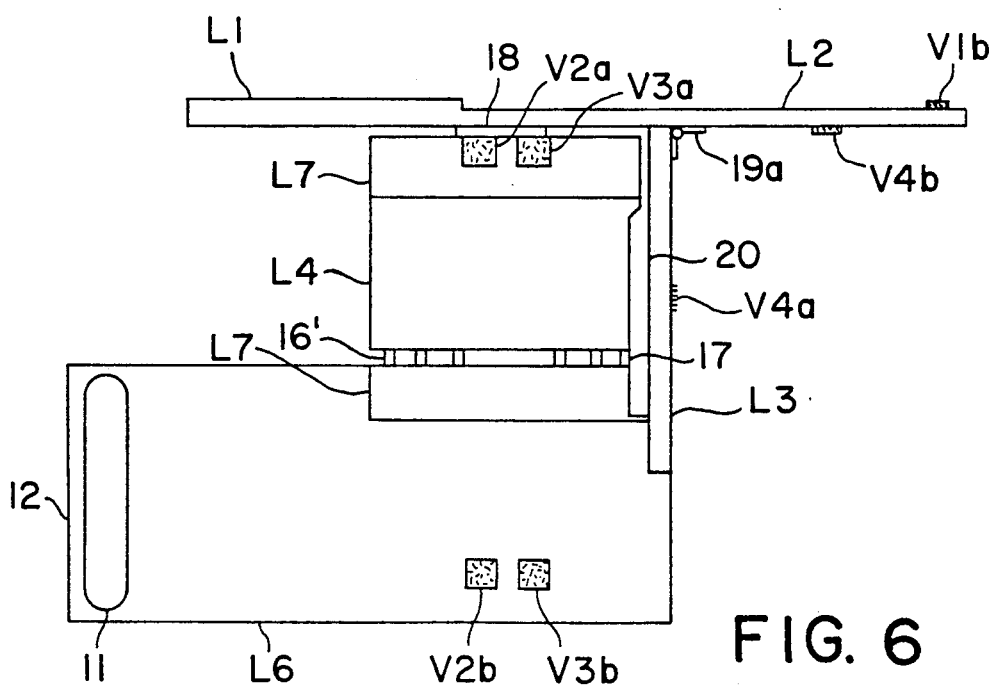
FIG. 6 is a right side view of the desk of FIG. 5.

FIG. 6 is a right side view of desk 1. As shown therein, leaf L6 has two VELCRO patches V2b and V3b. Leaf L7 has two VELCRO patches V2a, V3a which will meet and engage patches V2b and V3b on leaf L6 in the collapsed position. Leaf L3 has a VELCRO patch V4a on its front surface which, when leaf L3 is folded into the collapsed position to lie against the undersurface of leaf L1, meets and engages a VELCRO patch Vb4 on the lower surface of leaf L1. Leaf L2 is fixedly mounted on leaf L6 to project outwardly therefrom. Correspondingly, leaf L7 is fixedly mounted on leaf L4 to project outwardly therefrom, and leaf L4 is foldably connected to leaf L6 by hinges 16, 17. Leaf L7 is turn foldably connected to the underside of leaf L1 by hinge 18, and leaf L3 is foldably connected to the underside of leaf L1 by hinges 19a, 19b. The lower edge of leaf L4 rests on the upper edge of leaf L5, and therefore is not coplaner with leaf L6 in the extended position.

Figure 7:
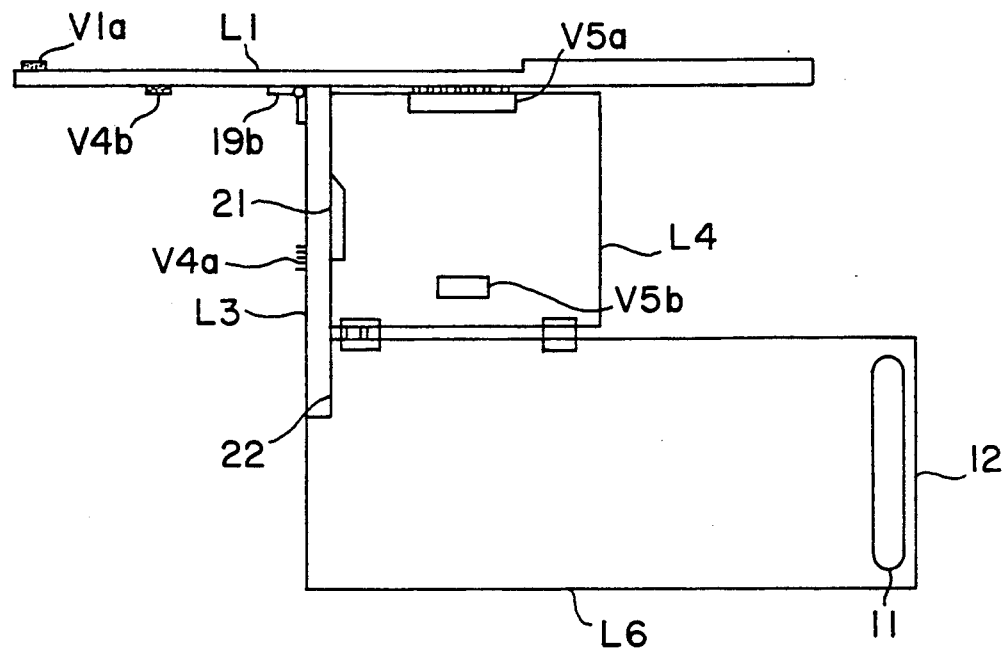
FIG. 7 is a left side view of the desk of FIG. 5.

As shown in FIGS. 6 and 7, leaf L3 has mounted on the rear surface thereof facing abutments 20, 21 which lie on either side of and snugly fit against leaves L4 and L5 on the right hand side (FIG. 6) and leaf L4 on the left hand side (FIG. 7). Leaf L6 has on its forward surface a notch 22 which matingly receives a corresponding notch 23 at the bottom edge of leaf L3 (see FIG. 12). Consequently, when leaf L3 is folded down into the extended position, it holds in place, and correspondingly is held in place, by abutments 20, 21 gripping leaf L4 and by notch 22 gripping notch 23 of leaf L6. Leaves L3 and L4 therefore form a rigid "T" shape to hold leaf L1 in place to form the horizontal work surface, while correspondingly leaves L3 and L6 form another "T" shape to immovable engage the seat cushions of seats 2, 3, with leaf L6 preventing side-to-side movement and leaf L3 resting on top of the seat cushions to support desk 1 in place without tilting.

Figure 8:
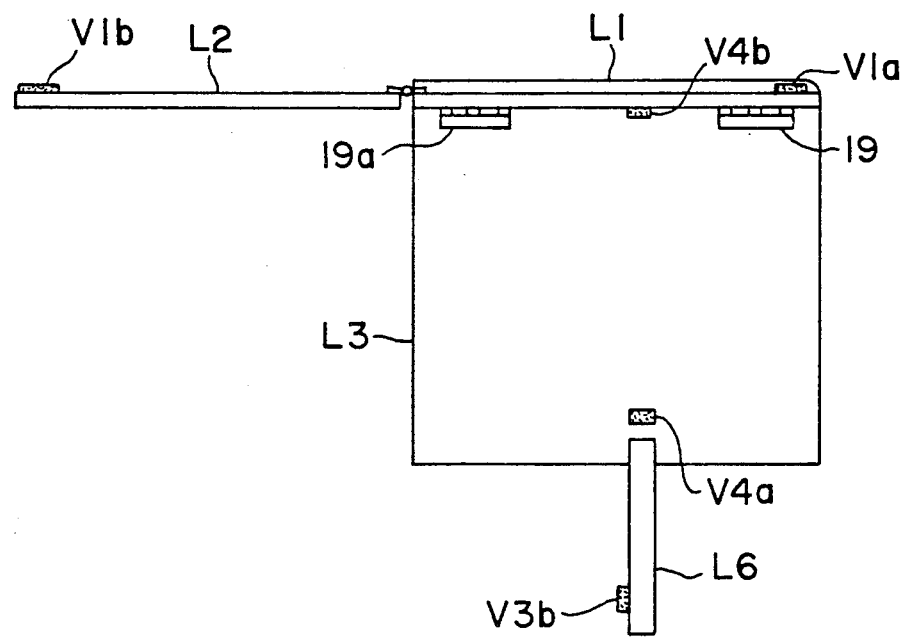
FIG. 8 is a rear view of the desk of FIG. 5.
Figure 9:
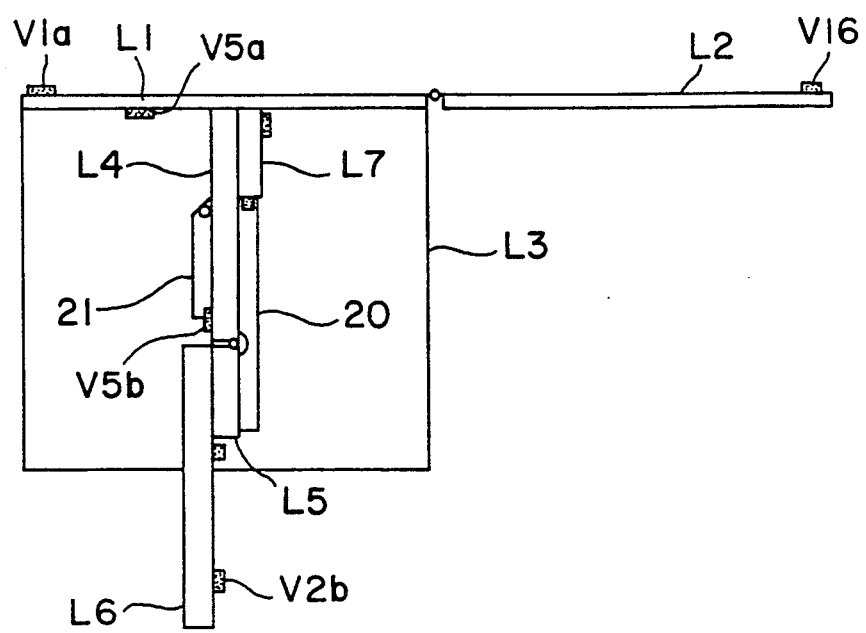
FIG. 9 is a front view of the desk of FIG. 5.
Figure 10:
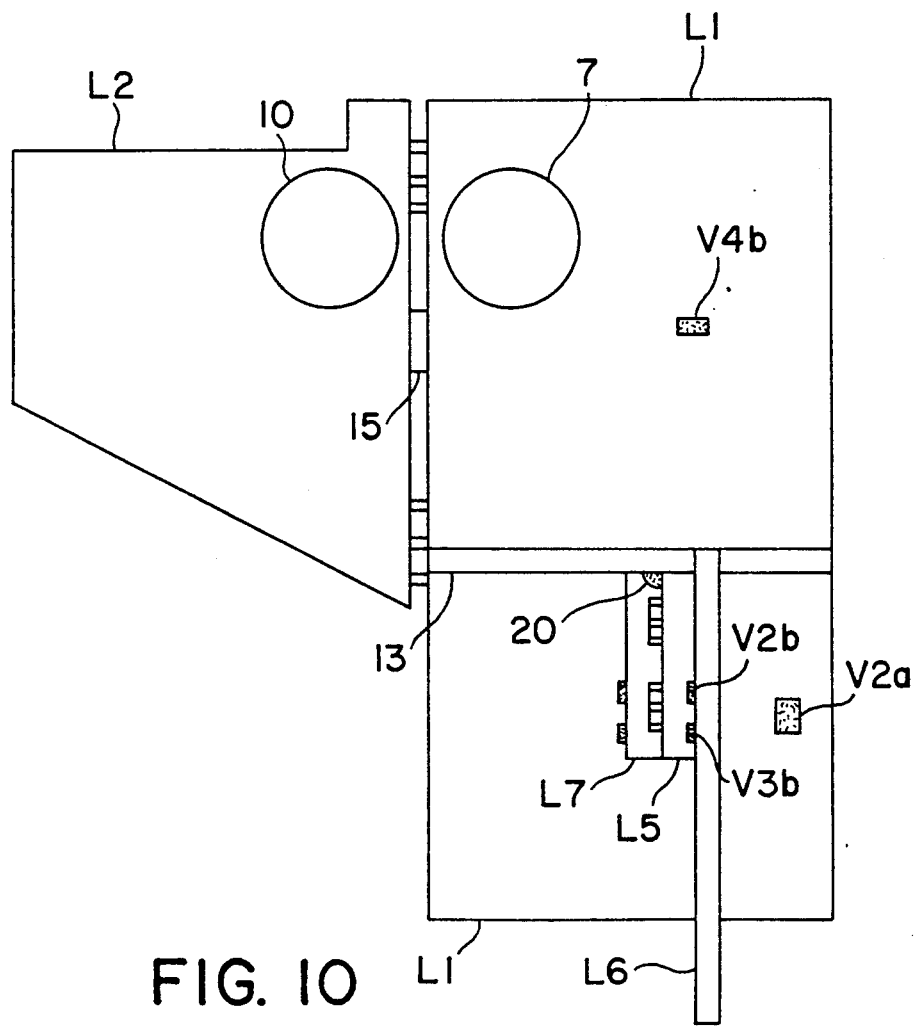
FIG. 10 is a bottom view of the desk of FIG. 5.

Turning to the left side of desk 1 shown in FIG. 7, leaf L4 has a VELCRO patch V5b adapted to meet and engage VELCRO patch V5a on the lower surface of leaf L1. FIG. 8, which is a front view of desk 1, illustrates the "T" configuration of leaves L3, L6. FIG. 9, which is a rear view of desk 1, illustrates how the leaves form the two "T" configurations in the extended position and furthermore how the leaves are folded to form a double-thickness for improved support of leaf L1. FIG. 10, a bottom view of desk 1, again illustrates the reinforced "T" configurations.

Figure 11:
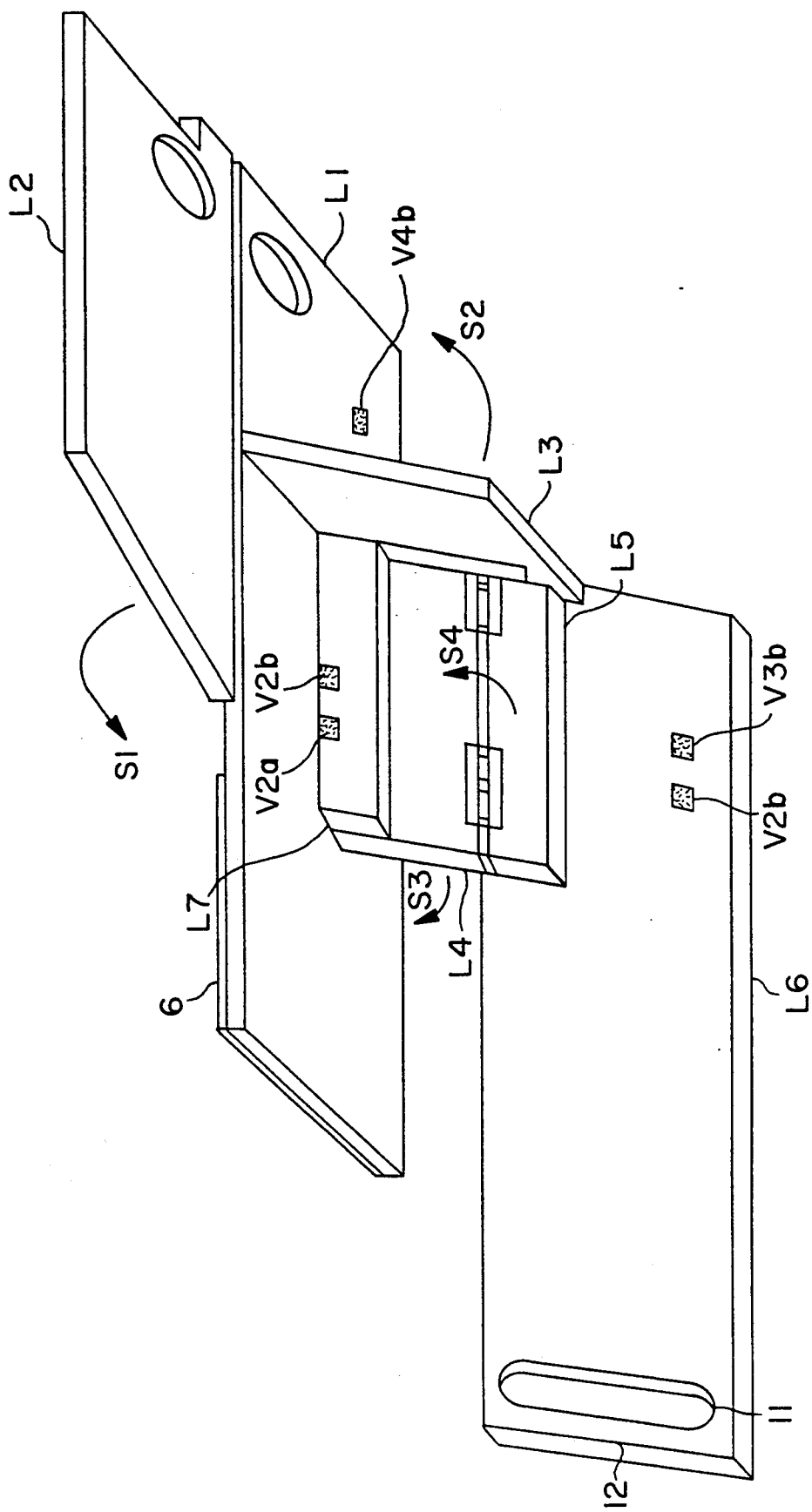
FIG. 11 is a side elevational view of the desk of FIG. 5, indicating how the desk may be folded from its extended configuration to its collapsed configuration.

A description will now be given in conjunction with FIGS. 11 and 12 on how desk 1 may be folded from its extended position into its collapsed position. While the steps for folding desk 1 are illustrated in a convenient sequence, it will be apparent that the order of certain of the steps may be changed without affecting the final results. Thus, the first step S1 is to fold leaf L2 over to lie on top of leaf L1, so that VELCRO patches V1a, V1b meet and engage to hold leaf L2 in position against leaf L1. In the second step S2, leaf L3 is folded forwardly and upwardly to lie against the undersurface of leaf L1, with VELCRO patch V4a on leaf L3 meeting and engaging VELCRO patch V4b on leaf L1. This frees leaves L4–L7 to be folded into position. Thus, in step S3, leaf L4 is folded backwards so that patch V5b (FIG. 3) meets and engages patch V5a on the undersurface of leaf L1. This presents patches V2a, V3a on leaf L7 in a horizontal, downwardly facing orientation. At substantially the same time as step S3, in step S4 joined leaves L5 and L6 are folded forwardly and upwardly so that patches V2b and V3b on leaf L6 meet and engage patches V2a, V3a on leaf L7. It will be seen that leaves L5 and L7, having the same depth, ensure that patches V2b, V3b and V2a, V3a are presented in facing engagement in the collapsed position.

Therefore, in these four easy steps, desk 1 can be folded from the extended position to the collapsed position. Indeed, once leaf L3 is swung into position in step S2, the movements of steps S3 and S4 will occur naturally as leaves L4–L7 are no longer held rigidly in place by leaf L3. Moreover, it will be seen that the collapsing process requires very little more space than that occupied by desk 1 itself in the extended position, with additional room required only for leaf L2 to fold over onto leaf L1. As a result, desk 1 can be easily folded into its collapsed position before it is removed from car 4, and then can be easily removed through the car door opening. Of course, to assemble desk 1 from its collapsed position to its extended position requires only that the steps be performed in the reverse order.

Figure 12:
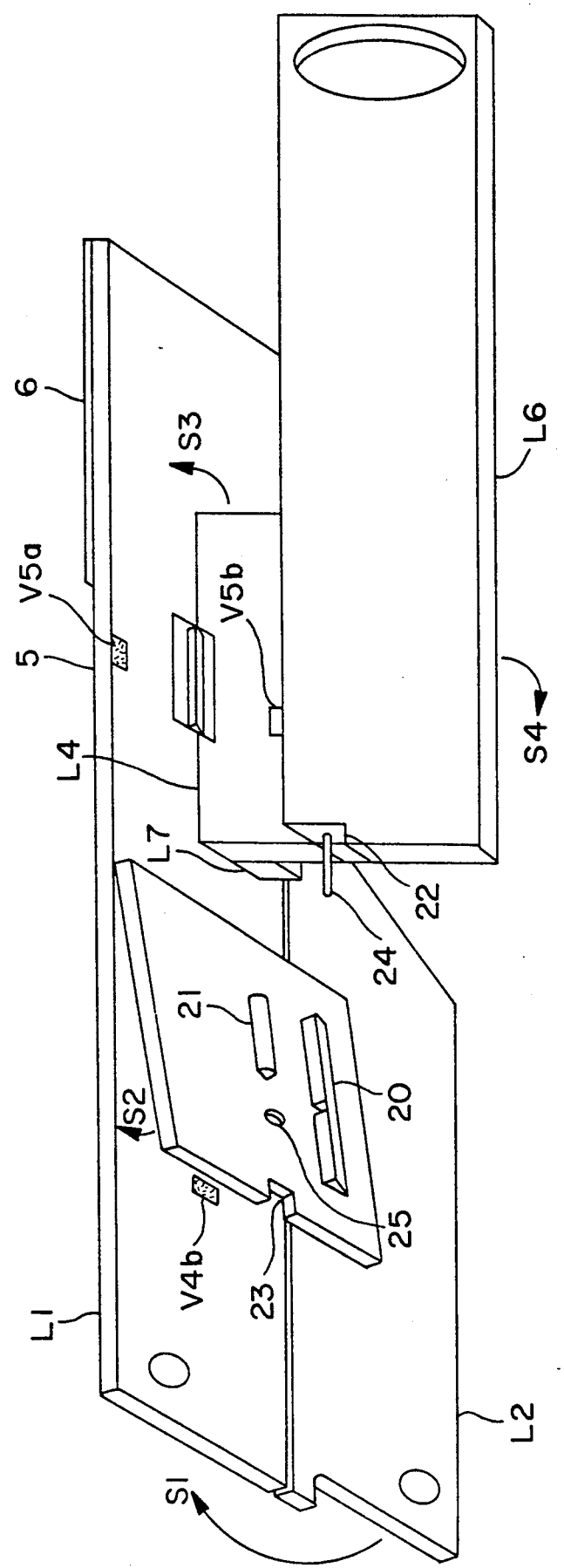
FIG. 12 is a side perspective view of the desk of FIG. 5, in a partially collapsed configuration.

FIG. 12 illustrates desk 1 in a partially collapsed position, as leaf L3 is being folded upwardly in step S2. As shown therein, a further stabilizing feature is provided by pin 24 extending from notch 23 of leaf L6, which is adapted to be received in pin hole 25 in leaf L3. The weight of desk 1 resting on leaf L3 will also tend to hold leaf L3 securely in position by friction between notches 22, 23.

Desk 1 may be made of any suitable material, such as wood, metal or plastic. If made of a conducting or magnetic material, a suitable coating or upper layer may be provided on leaves L1, L2 or the entire desk 1 to prevent any interference with electronic equipment placed thereon.

While desk 1 has been described in connection with use in a car, it will be apparent that desk 1 may also suitably be used in any human-adapted seating area having appropriate abutting cushions or an abutting cushion and arm rest. Thus, desk 1 may be readily carried onto a bus or train for use in travelling, or may be used at home on a sofa or chair. Alternatively, the structure of desk 1 might be modified to provide two engaging leaves, such as leaf L6, to fit on either side of a seat arm or the like.

As described above, the collapsible portable desk of the present invention provides a secure desk surface when in the extended position, while at the same time folding to an easily-carried size in the collapsed configuration. Of course, the above description has been given on the preferred embodiment, and the scope of the present invention is to be determined by reference to the appended claims.

I claim:

1. A collapsible portable desk adapted to be supported by a human-adapted seating area of the type having two abutting resilient seat cushions, each seat cushion able to accommodate at least one person and the two seat cushion abutting along a first vertical plane, said desk comprising:
    a plurality of planar leaves foldably connected to selectively assume an extended configuration and a collapsed configuration, and
    a selected one of said planar leaves including a grip portion adapted to be grasped by a human hand for carrying said desk,
    wherein, in the extended configuration, a first one of said planar leaves defines a first engaging means removably fitted between the two seat cushions along the first vertical plane therebetween to be supported by opposing resilient pressure from the seat cushions, a second one of said planar leaves abuts said first leaf in a second vertical plane perpendicular to the first vertical plane such that said first and second leaves form a rigid T-shape, said second leaf having a lower edge that defines a second engaging means which rests on an upper surface of the seat cushions when said first leaf is fitted between the seat cushions when said first and second leaves prevent horizontal movement of said desk when said first leaf is fitted between the seat cushions, and a third one of said planar leaves is supported by said second leaf in a horizontal plane such that said second and third leaves form another rigid T-shape, said third leaf having an upper surface forming a work surface of said desk,
    wherein, in the collapsed configuration, all of said leaves are folded into parallel with each other, with said grip portion of said selected leaf being exposed for a human grasp, and said desk as a whole being of a size that fits through a standard car door opening.

2. A desk according to claim 1, wherein said grip portion is formed in said first leaf.

3. A desk according to claim 1, wherein said grip portion is an opening through said selected leaf to form a handle.

4. A desk according to claim 1, wherein a fourth one of said planar leaves is foldably connected to said third leaf to form, in said extended configuration, an extension of said work surface.

5. A desk according to claim 1, wherein, in said extended configuration, a fourth one of said planar leaves is locked to said first leaf to form an upper extension thereof in the first vertical plane, said fourth leaf further being locked to said second leaf such that said second and fourth leaves form another rigid T-shape, wherein said third leaf is supported in the horizontal plane by both said second and fourth leaves.

6. A desk according to claim 1, wherein, in said extended configuration, said second leaf is locked to said first leaf in the rigid T-shape.

7. A desk according to claim 6, wherein, in said extended configuration, said third leaf is locked to said second leaf ion the other rigid T-shape.

* * * * *